United States Patent
Hong (10) Patent No.: US 8,902,453 B2
(45) Date of Patent: Dec. 2, 2014

(54) SYSTEM FOR REQUIRING AUTHENTICATION FOR GENERATION OF NEW PRINTING JOB PROFILES FROM A CLIENT DEVICE

(75) Inventor: Jung-mo Hong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 924 days.

(21) Appl. No.: 12/422,472

(22) Filed: Apr. 13, 2009

(65) Prior Publication Data
US 2010/0046023 A1 Feb. 25, 2010

(30) Foreign Application Priority Data
Aug. 22, 2008 (KR) .................. 10-2008-0082491

(51) Int. Cl.
G06F 3/12 (2006.01)
H04N 1/333 (2006.01)
H04N 1/00 (2006.01)
H04N 1/23 (2006.01)

(52) U.S. Cl.
CPC .......... *H04N 1/00204* (2013.01); *G06F 3/1238* (2013.01); *H04N 1/33376* (2013.01); *H04N 1/00822* (2013.01); *H04N 1/00811* (2013.01); *H04N 1/2338* (2013.01); *G06F 3/1285* (2013.01); *H04N 2201/0039* (2013.01); *H04N 1/33369* (2013.01); *G06F 3/1257* (2013.01); *H04N 2201/33314* (2013.01); *H04N 1/00973* (2013.01); *G06F 3/1205* (2013.01); *H04N 1/2315* (2013.01); *H04N 1/2392* (2013.01); *H04N 1/333* (2013.01); *H04N 1/2369* (2013.01); *H04N 2201/0094* (2013.01); *H04N 1/00795* (2013.01); *H04N 1/2307* (2013.01); *G06F 3/1204* (2013.01); *H04N 1/00824* (2013.01)
USPC ....................................... 358/1.15

(58) Field of Classification Search
None
See application file for complete search history.

(56) References Cited

U.S. PATENT DOCUMENTS

2006/0238786 A1* 10/2006 Sakura et al. ................ 358/1.9
2006/0238793 A1* 10/2006 Akashi et al. ............... 358/1.13
2007/0146732 A1* 6/2007 Piazza et al. ................. 358/1.1
2007/0183002 A1* 8/2007 Corona ........................ 358/474

FOREIGN PATENT DOCUMENTS

JP 2004-303224 10/2004
JP 2007-130981 5/2007

* cited by examiner

*Primary Examiner* — Scott A Rogers
*Assistant Examiner* — John Wallace
(74) *Attorney, Agent, or Firm* — Staas & Halsey LLP (57) ABSTRACT

A client device to set a job profile for an image forming apparatus, the client device including: a driver unit to receive job option information from the image forming apparatus; and an application program unit to execute an application program for generating a user interface (UI) that provides a job profile corresponding to the received job option information. If the job profile is selected through the UI, the driver unit controls the image forming apparatus to perform a job by applying the job option information corresponding to the selected job profile. Accordingly, a user can easily perform the job setting.

22 Claims, 10 Drawing Sheets

SYSTEM FOR REQUIRING AUTHENTICATION FOR GENERATION OF NEW PRINTING JOB PROFILES FROM A CLIENT DEVICE

CROSS-REFERENCE TO RELATED APPLICATION

This application claims the benefit of Korean Patent Application No. 10-2008-0082491, filed Aug. 22, 2008, in the Korean Intellectual Property Office, the disclosure of which is incorporated herein by reference.

BACKGROUND OF THE INVENTION

1. Field of the Invention

Aspects of the present invention relate to a client device to set a job profile and a method thereof and, more particularly, to a client device to set a job profile and a method thereof that store job option information in an image forming apparatus using a job driver, and provide a selectable job profile using the stored job option information.

2. Description of the Related Art

Generally, an image forming apparatus may be a terminal existing as an individual device (such as a facsimile machine, a scanner, a printer, a copy machine, etc.) or a multifunction peripheral in which the above-described devices are integrated. In the case where such an image forming apparatus is used in association with a computer, driver programs (such as a printer driver, a scan driver, etc.) that are provided by manufacturers to control operations of the image forming apparatus are installed in the computer.

Such a driver provides a job profile for user convenience and improvement of picture quality in scanning a specified print medium (such as paper, a transparency, etc.). In this case, the job profile may be set by a user, and can be deleted or changed. However, if the driver has been deleted from a client device, the job profile set by the user cannot be used, resulting in an inconvenience to the user. In addition, the job profile is set for each client device used by the user, also resulting in an inconvenience to the user.

SUMMARY OF THE INVENTION

Aspects of the present invention provide a client device to set a job profile and a method thereof that stores job option information in an image forming apparatus using a job driver, and provides a selectable job profile using the stored job option information.

According to an aspect of the present invention, there is provided a client device, connected to an image forming apparatus, to control the image forming apparatus, the client device including: a driver unit to receive job option information from the image forming apparatus; and an application program unit to execute an application program for generating a user interface (UI) that provides a job profile corresponding to the received job option information, wherein, if the job profile is selected through the UI, the driver unit controls the image forming apparatus to perform a job by applying the job option information of the selected job profile.

The image forming apparatus may be a scanning device that performs a scan, the job option information may be option information of a scan job, the job profile may be a scan profile, and the driver unit may receive the job option information by executing a scan driver.

If the image forming apparatus uses user authentication information, the driver unit may request the user authentication information from the application program unit, and the application program unit may provide a user authentication UI to receive an input of the user authentication information from a user.

The driver unit may transmit the user authentication information inputted through the user authentication UI to the image forming apparatus, may receive job option information corresponding to the user authentication information, and may provide the received job option information to the application program unit.

The generated UI may provide a plurality of job profiles respectively corresponding to a plurality of received job option information, such that if a job profile is selected, the application program unit displays the corresponding job option information through the UI.

The application program unit may provide another UI to receive an input of job option information of a corresponding job profile, and may request the driver unit to transmit the input job option information to the image forming apparatus.

The job option information may be a name of the job profile, a version of a job driver, a user ID, a name of the application program, and/or actual job information data.

According to another aspect of the present invention, there is provided a client device, connected to an image forming apparatus, to control the image forming apparatus, the client device including: a driver control unit to request job option information stored in the image forming apparatus and to receive at least one job option information; and a user interface (UI) generation unit to generate a UI that provides at least one selectable job profile respectively corresponding to the received at least one job option information.

If the image forming apparatus uses user authentication information, the driver control unit may control the UI generation unit to provide a user authentication UI to receive an input of the user authentication information from a user, may transmit the user authentication information input through the user authentication UI to the image forming apparatus, and may receive at least one job option information corresponding to the user authentication information.

If a job profile is selected through the UI from among the at least one selectable job profile, the driver control unit may control the UI generation unit to display the job option information corresponding to the selected job profile.

If a scan command for a document to be scanned is inputted through the UI, the driver control unit may control the image forming apparatus to perform a scan in accordance with the displayed job option information.

The driver control unit may control the UI generation unit to provide another UI to receive an input of job option information of a corresponding job profile, and may transmit the input job option information to the image forming apparatus.

According to still another aspect of the present invention, there is provided an image forming apparatus, connected to at least one client device having a job driver, the image forming apparatus including: a communication interface unit to receive job option information from the client device; and a control unit to analyze the received job option information, to generate a profile list according to the analyzed job option information, and to store the generated profile list, wherein, if the client device requests a profile, the control unit transmits at least one profile selectable by the client device based on the stored profile list.

The control unit may perform a user authentication of a user of the client device, and may transmit the profile corresponding to the user authentication information to the client device.

According to still another aspect of the present invention, there is provided a method of setting a job profile of a client device connected to an image forming apparatus, the method including: executing an application program corresponding to a job that is performed by the image forming apparatus; receiving job option information from the image forming apparatus according to the job; generating a user interface (UI) to provide a job profile corresponding to the received job option information; and if the job profile is selected through the UI, controlling the image forming apparatus to perform the job by applying the job option information of the selected job profile.

The method may further include, if the job option information of the job profile is changed, storing the changed job option information in the image forming apparatus.

The method may further include performing user authentication if the image forming apparatus uses the user authentication information.

The receiving of the job option information may include receiving job option information corresponding to the performed user authentication.

The generating of the UI may include: generating the U to provide a plurality of job profiles respectively corresponding to a plurality of received job option information; and if a job profile of the plurality of job profiles is selected, displaying the corresponding job option information through the UI.

The method may further include, if a job command for a document that is an object of the job is inputted through the UI, controlling the image forming apparatus to perform the job according to the job option information displayed on the UI.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
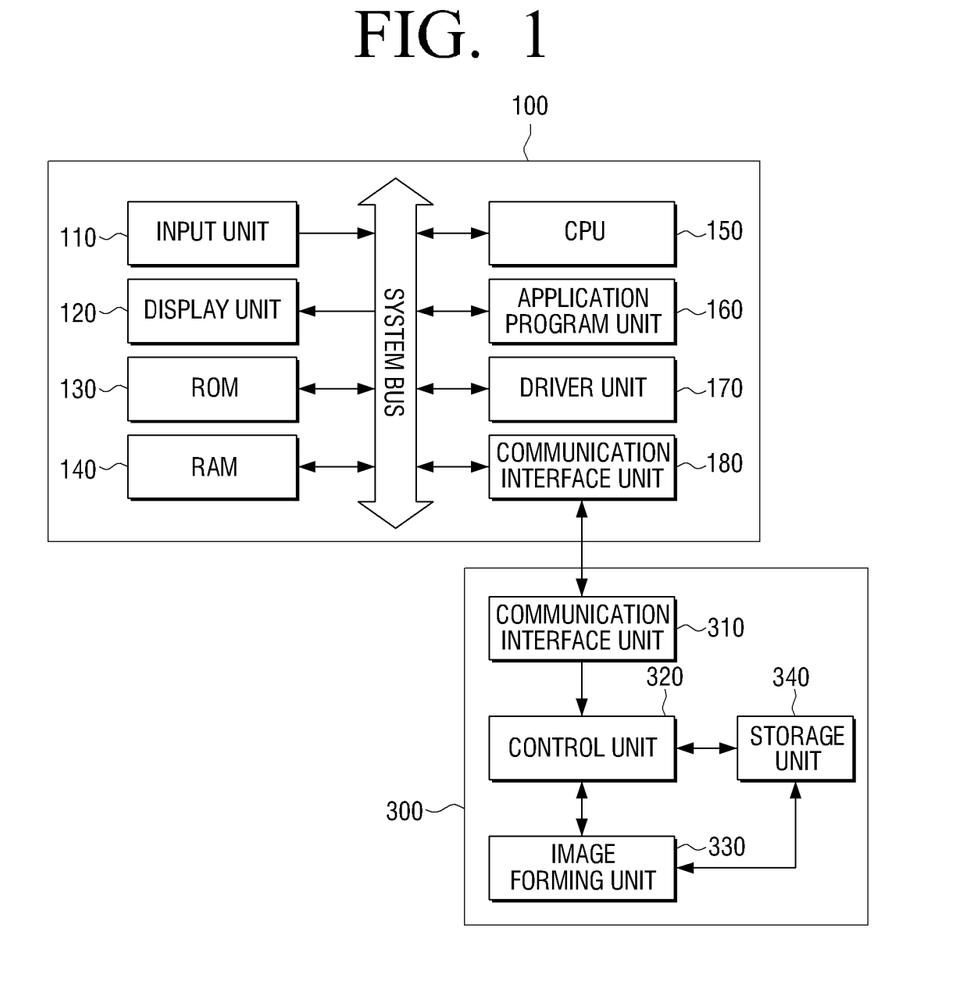
FIG. 1 is a block diagram illustrating a configuration of a client device according to an embodiment of the present invention.

FIG. 1 is a block diagram illustrating a configuration of a client device 100 according to an embodiment of the present invention. Referring to FIG. 1, the client device 100 includes an input unit 110, a display unit 120, a read only memory (ROM) 130, a random access memory (RAM) 140, a central processing unit (CPU) 150, an application program unit 160, a driver unit 170, and a communication interface unit 180.

The input unit 110 is connectable to an input device (such as a key input device), and applies an input signal inputted from the input device to the CPU 150. The input device is a type of user interface medium, and is provided with one or more operation devices (such as keys, a rotatable dial, a touch screen, a mouse, a keyboard, etc.) for setting or selecting operations supported by the client device 100.

The display unit 120 is a device to display various types of display information provided from the CPU 150. The display unit 120 may be a monitor implemented by a cathode ray tube (CRT), a liquid crystal display (LCD), etc. Furthermore, the display unit 120 and the input unit 110 may be integrally provided as a touch screen.

The ROM 130 stores therein various types of control programs used to implement the operation of the client device 100. For example, the ROM 130 may store therein an operating system (OS) that is a control program of the CPU 150, application programs related to image forming, and/or a driver to control the driving of an image forming apparatus 300.

The RAM 140 temporarily stores therein various types of data in accordance with the CPU's execution of the programs. That is, a program executed by the CPU 150 is loaded from the ROM 130 and stored in the RAM 130.

The CPU 150 controls the operation of the client device 100 by performing the control programs stored in the ROM 130. That is, the CPU 150 according to aspects of the present invention controls the operation of the application program unit 160 to drive the application programs related to job option information to be applied to a document and the operation of the driver unit 170 to drive the driver programs related to the operation of the image forming apparatus 300.

Examples of the application programs include programs to set scan information by providing settings of option information of the document to be scanned, an image filtering operation that is not provided by the driver unit 170, a file format modifying function, etc. Although a scan operation is provided as a job related to image forming herein, it is understood that aspects of the present invention are not limited thereto. For example, the job related to image forming may be printing, faxing, etc.

The application program unit 160 generates a user interface (UI) to provide a job profile to set and/or to select a job option. Also, the application program unit 160 supports operations that are not supported by the driver.

The driver unit 170 serves as an interface between the application program unit 160 and the image forming apparatus 300 by executing a printer driver and/or a scan driver to drive an image forming unit 330 (such as a printer, a scanner, etc.) provided in the image forming apparatus 300.

The communication interface unit 180 is connected to the image forming apparatus 300 through a connection interface (such as universal serial bus (USB), line print terminal (LPT), IEEE1394, a network, etc.), and performs a bidirectional communication with the image forming apparatus 300. In detail, the communication interface unit 180, under the control of the CPU 150, transmits information provided from the driver unit 170 to the image forming apparatus 300, or receives and provides scan data read by the scanner of the image forming apparatus 300 to the driver unit 170.

The operations related to the application program unit 160 and the driver unit 170, and the operations related to the driver unit 170 and the image forming apparatus 300 will be described in detail with reference to FIGS. 3 to 8.

Herein, the image forming apparatus is provided as a device capable of performing a scan operation, the job option information is provided as scan option information on a scan job, the job profile is provided as a scan profile, and the driver unit is provide as a client device to receive the job option information (i.e., the scan option information) by executing the scan driver. However, it is understood that aspects of the present invention are not limited to a scan operation, and may be applied to other image forming operations (such as a print operation, a fax operation, etc.).

Figure 3:
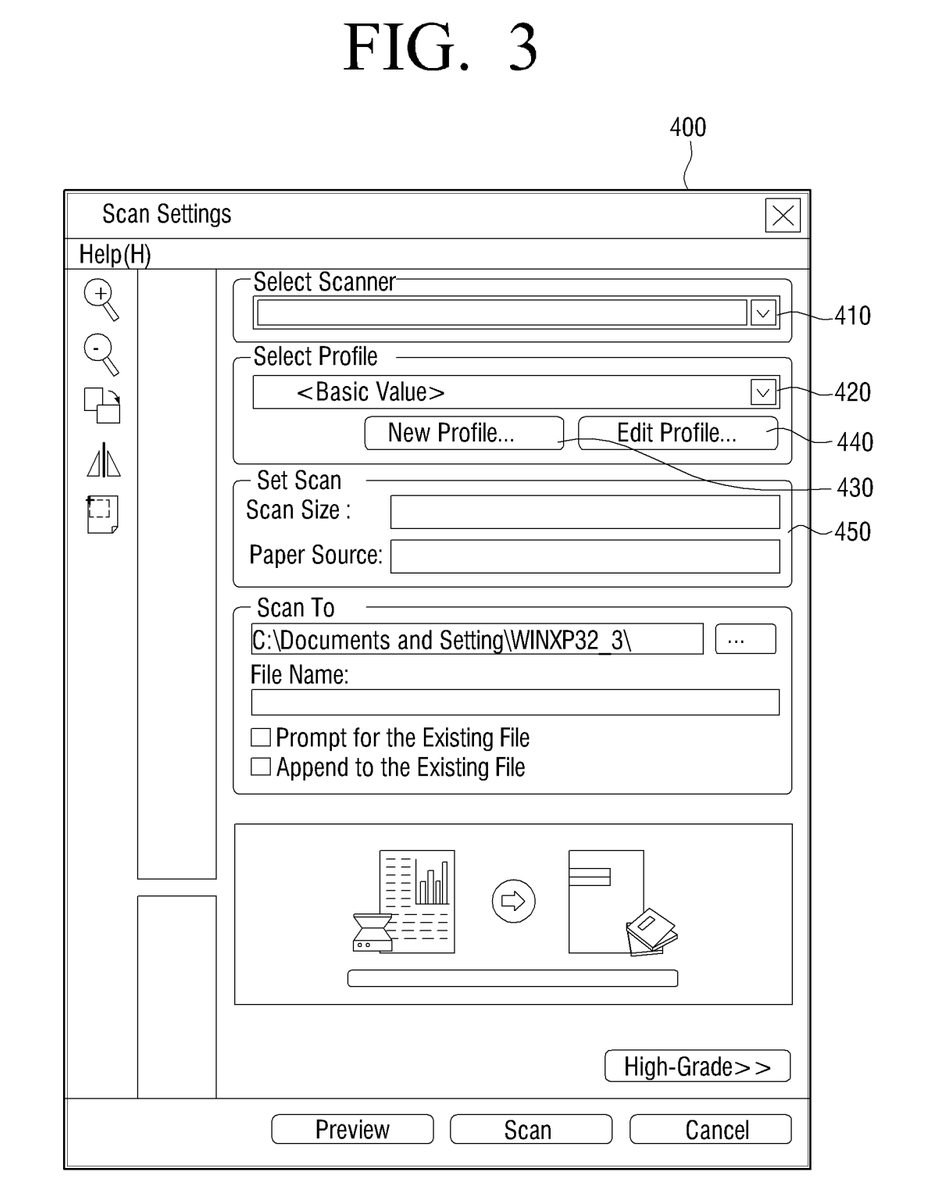
FIGS. 3 to 8 are views explaining a method of setting a job profile of a client device according to an embodiment of the present invention.

FIG. 3 is a view illustrating a UI 400 provided to operate a scan application program, according to an embodiment of the present invention. Referring to FIG. 3, the UI 400 includes a scanner selection unit 410, a profile selection unit 420, a profile generation unit 430, a profile editing unit 440, and a scan setting unit 450. The UI 400 is connected to a store driver in accordance with a selection of a scanner through the scanner selection unit 410, and selects one of predetermined profiles through the profile selection unit 420. Also, the UI 400 sets a new profile through the profile generation unit 430, and performs editing through the profile editing unit 440.

If the profile generation unit 430 is selected, the application program unit 160 provides a UI to receive an input of the job option information of the job profile. Also, the application program unit 160 may provide a user authentication UI.

If the profile editing unit 440 is selected, the application program unit 160 transmits the job option information of the job profile that has been modified by a user to the driver unit 170. The driver unit 170 then transmits the job option information of the modified job profile to the image forming apparatus 300 to store the job option information in the image forming apparatus 300.

Figure 4:
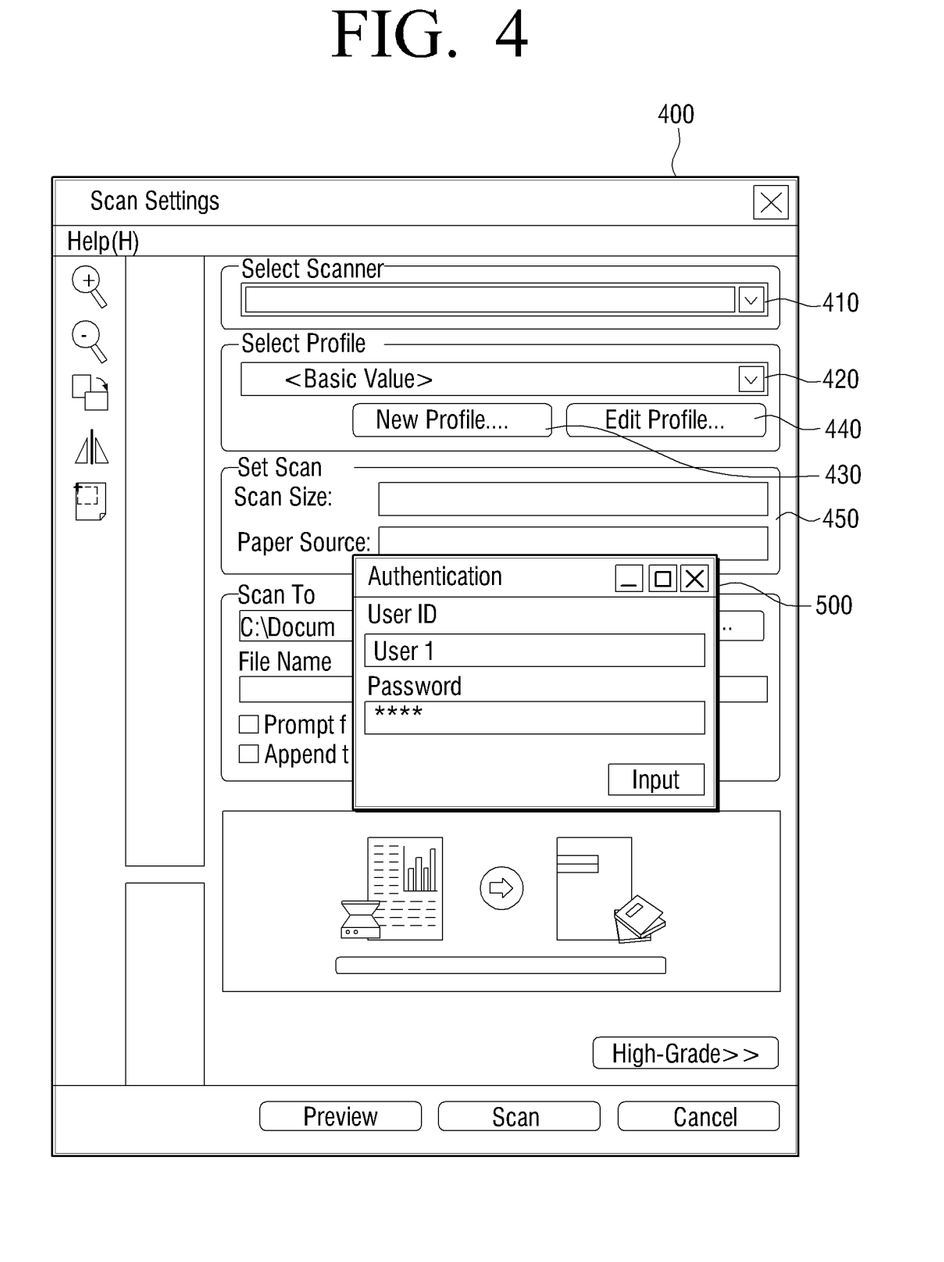

FIG. 4 is a view illustrating a user authentication UI 500 according to an embodiment of the present invention. Here, the user authentication UI 500 may be provided when the application program is executed and/or generation of a new profile is requested by a user. The user authentication UI 500 receives an input of a user ID and a password from the user. Also, the user authentication UI 500 provides a UI to receive an input of the job option information to receive the option information from the user.

Figure 5:
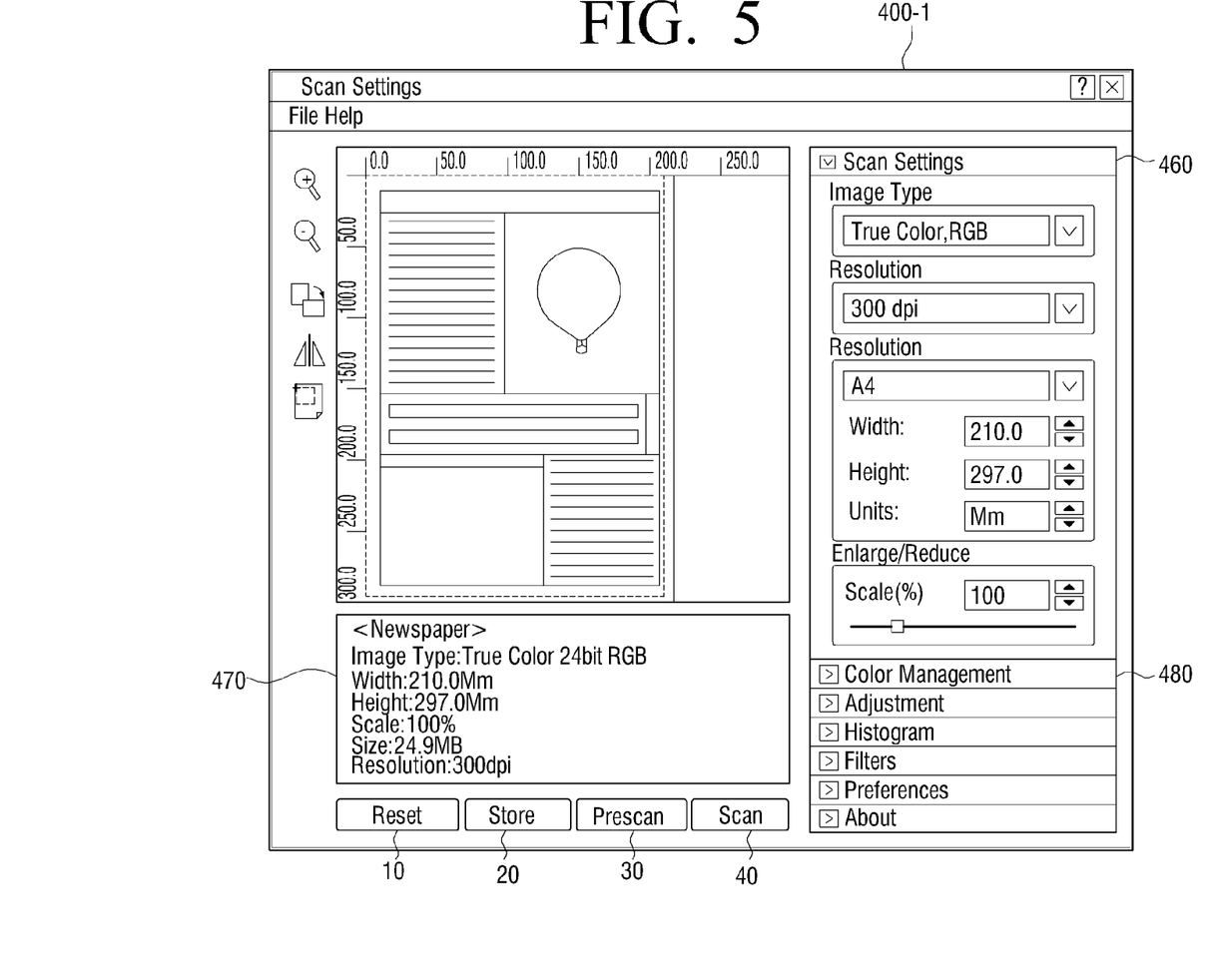

FIG. 5 is a view illustrating a UI 400-1 to receive an input of the job option information (i.e., the scan option information). Referring to FIG. 5, the UI 400-1 includes a scan setting unit 460 to set actual scan information data, a display unit 470 to display the set scan information, an operation providing unit 480 to provide one or more operations that are not provided by the driver, a reset key 10, a storage key 20, a pre-scan key 30, and a scan key 40.

Here, if the storage key 20 is selected (i.e., inputted), the application program unit 160 transmits the option information received from the user (i.e. the job option information including the actual scan information data, the user authentication information, the name of the scan profile, the name of the application program, etc.) to the driver unit 170. Here, the actual scan information data may include an image type, a resolution, a recording medium size, a brightness value, a luminance value, a highlight ratio, a shadow ratio, a scale enlargement and reduction, filtering information, preference type information, etc. Such scan information data may be provided from the UI 400-1 through the driver, and the profile can be set using the scan information data received from the user through the UI 400-1. The driver unit 170 transmits the received job option information to the image forming apparatus 300 connected thereto.

Referring back to FIG. 1, the image forming apparatus 300 includes a communication interface unit 310, a control unit 320, an image forming unit 330, and a storage unit 340. Here, if the job option information that has been transmitted from the driver unit 170 (of the client device 100) is received through the communication interface unit 310, the control unit 320 analyzes the job option information, generates a profile list accordingly, and stores the generated profile list in the storage unit 340.

The storage unit 340 stores the job option information. Moreover, the storage unit 340 may classify the job option information on a specified or predetermined basis, such that the classified job option information is stored therein.

The control unit 320 classifies and stores the job profiles by users based on the user authentication information transmitted thereto. Accordingly, if job option information is requested thereafter, the control unit 320 transmits the job option information of the job profile permitted for the user based on the user authentication information, to the driver unit 170 of the client device 100.

Figure 6:
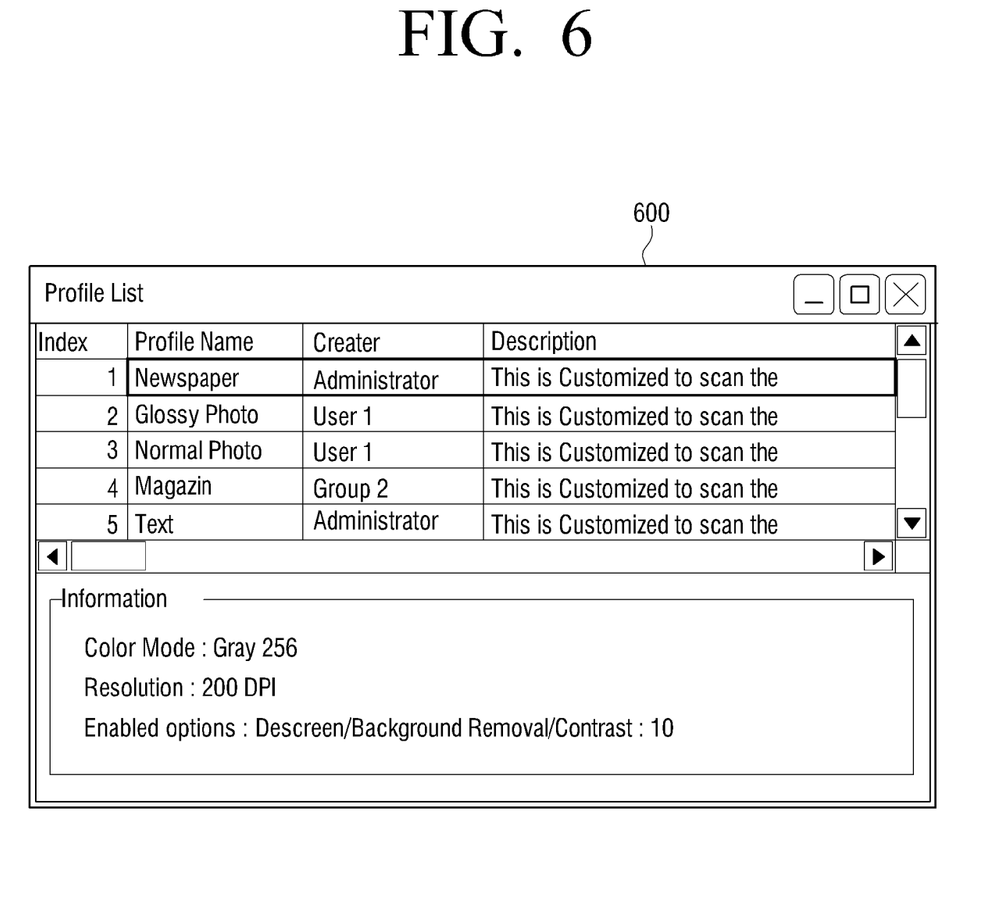

FIG. 6 is a view illustrating a profile list 600 according to an embodiment of the present invention. The profile list 600 illustrated in FIG. 6 may be information stored in the storage unit 340 of the image forming apparatus 300, and/or a profile list that the driver unit 170 has requested from the image forming apparatus 300 through the application program.

Figure 7:
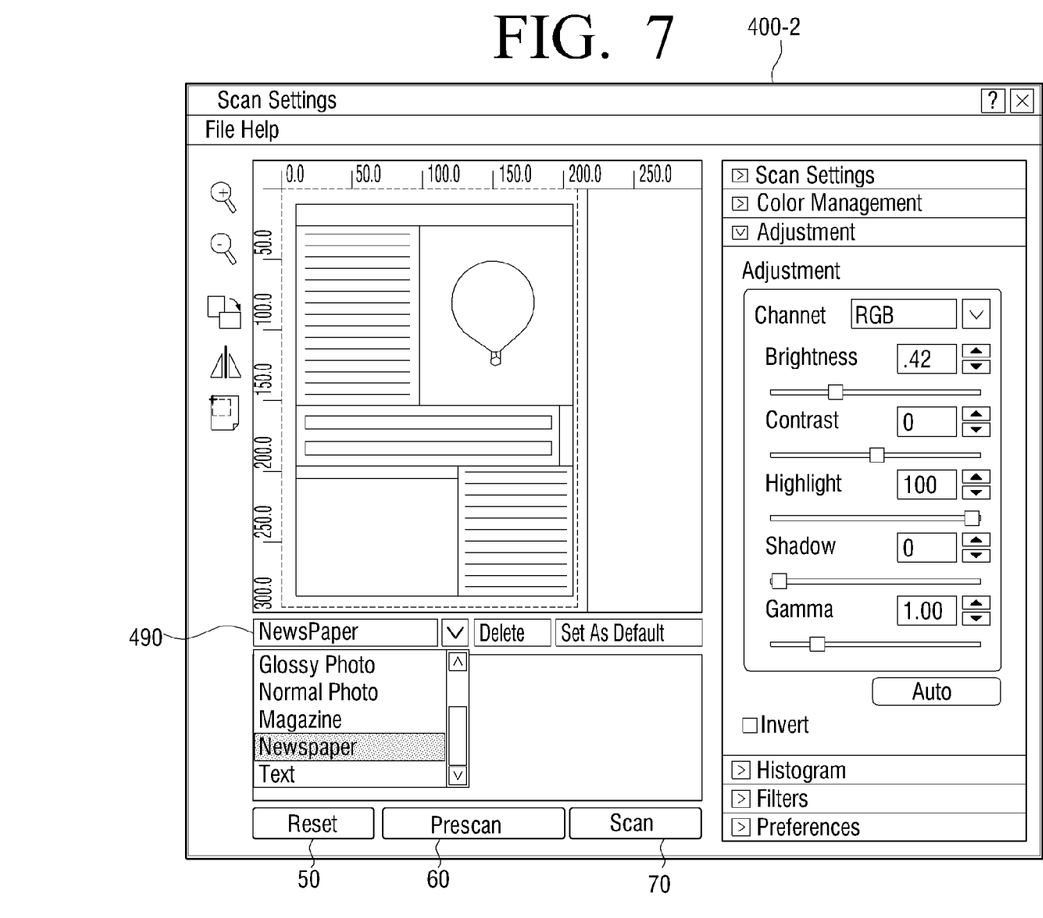

FIG. 7 is a view illustrating a UI 400-2 provided when the application program is executed, according to an embodiment of the present invention. Referring to FIG. 7, the UI 400-2 includes a profile selection window 490 to provide at least one profile permitted to the user, a reset key 50, a pre-scan key 60, a scan key 70, and the like. Here, if one of the profiles provided in the profile selection window 490 is selected by the user, the application program unit 160 displays the corresponding job option information on the UI 400-2.

Figure 8:
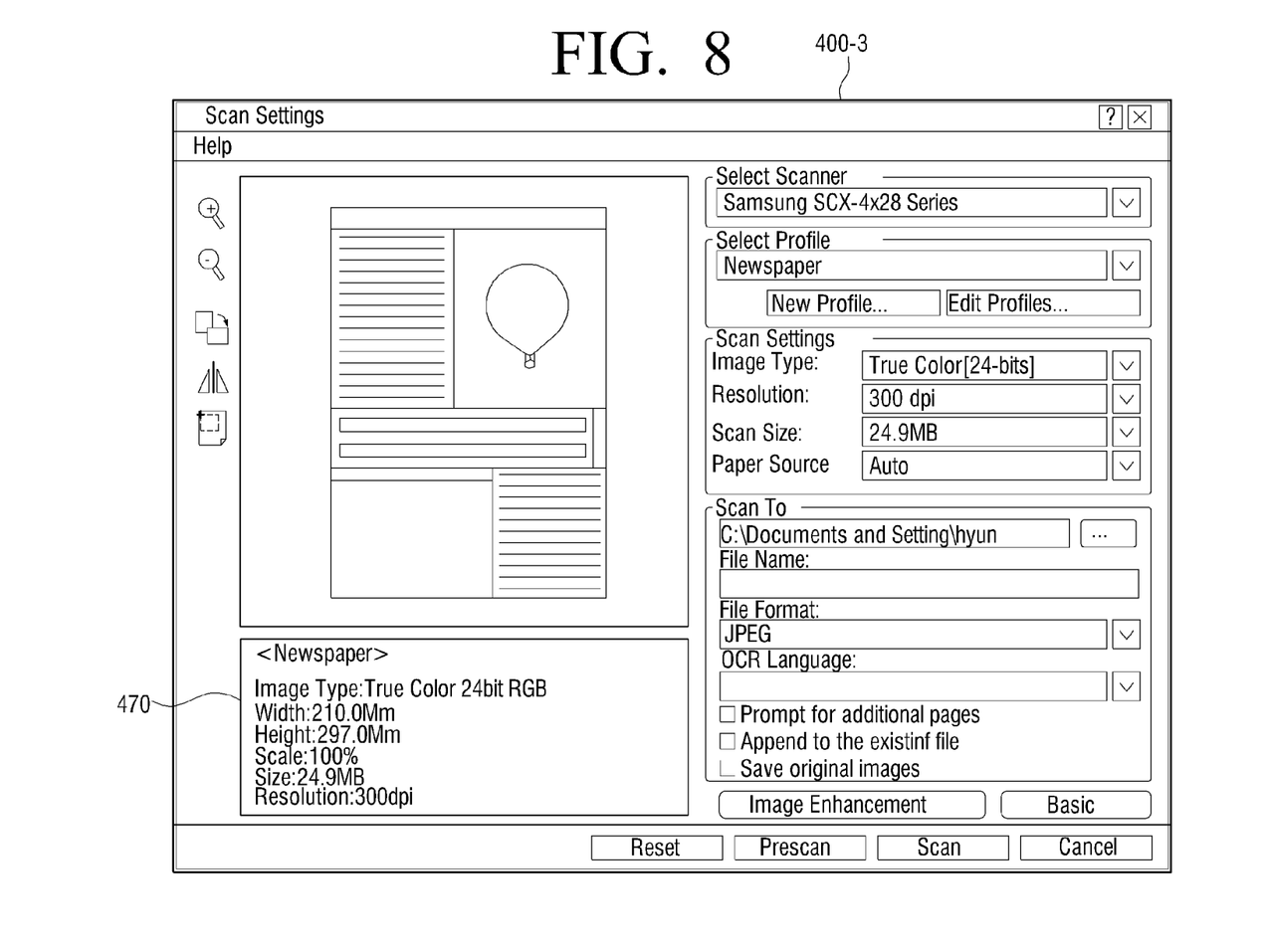

As can be seen, FIG. 7 is a view illustrating the UI 400-2 displayed when "Newspaper" is selected among the selectable profiles, and FIG. 8 is a view illustrating the UI 400-3 displayed when the job option information is automatically set in accordance with the selection of "Newspaper." Referring to FIG. 8, it can be confirmed that the job option information of "Newspaper" received from the image forming apparatus 300 has been set. Accordingly, the user can easily perform the profile setting without inputting the user's profile settings one by one.

If a scan command is inputted, the application program unit 160 requests the scan from the driver unit 170, and the driver unit 170 controls the image forming apparatus 300 to scan a corresponding document in accordance with the set scan option information. For example, the scan option information may be scan execution data that further includes an additional option and options on filtering, format change, etc.

The image forming apparatus 300 receives a scan command and scan execution data from the driver unit 170 and performs the scan accordingly. Moreover, the image forming apparatus 300 may be connected to a plurality of client devices, and each client device connected to the image forming apparatus 300 may have the configuration as illustrated in FIG. 1. Accordingly, users of the client devices who use the image forming apparatus 300 can share the profile list, and thus a user of a first client device can receive a profile set by the user from the image forming apparatus 300 and can easily set the job profile even if the user uses a second client device.

Figure 2:
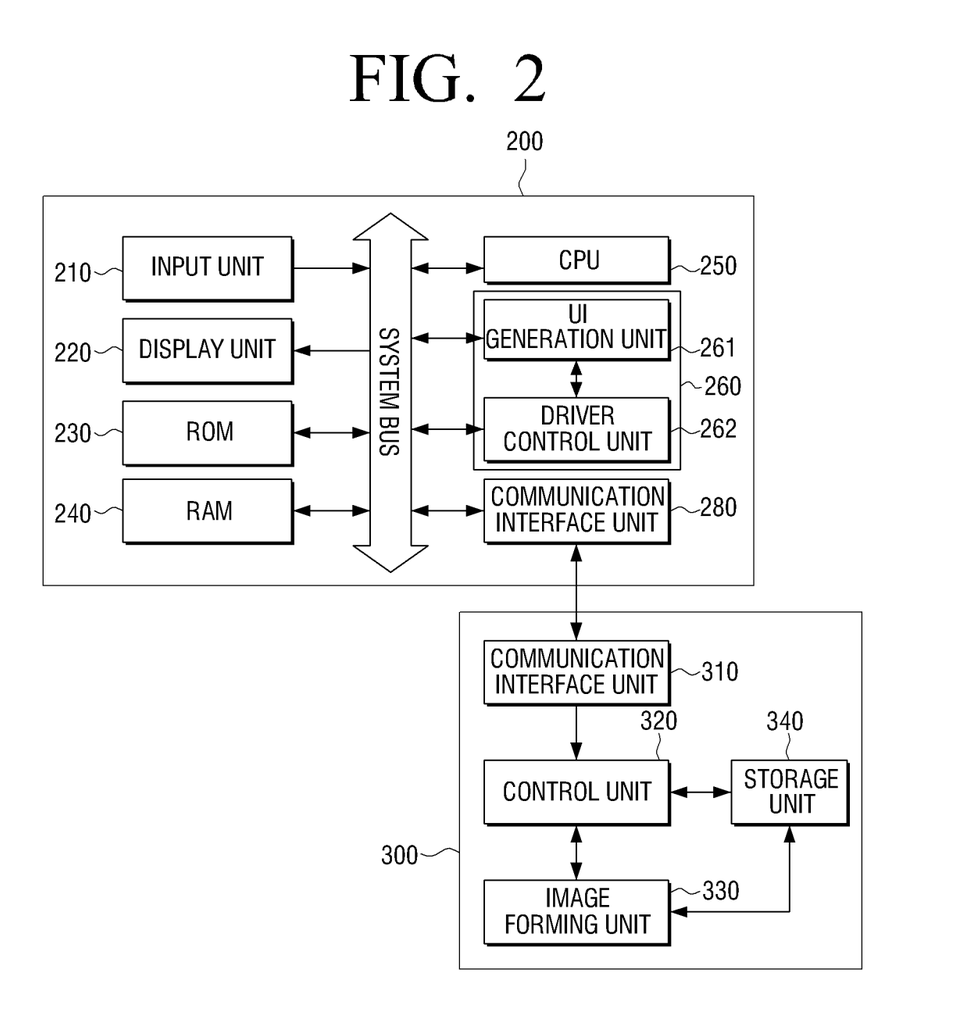
FIG. 2 is a block diagram illustrating a configuration of a client device according to another embodiment of the present invention.

FIG. 2 is a block diagram illustrating a configuration of a client device 200 according to another embodiment of the present invention. Referring to FIG. 2, the client device 200 includes an input unit 210, a display unit 220, a ROM 230, a RAM 240, a CPU 250, a driver unit 260, and a communication interface unit 280. Here, the configuration of the client device 200, except for the driver unit 260, is the same as that of the client device 100 as illustrated in FIG. 1, and a detailed description thereof will be omitted.

The driver unit 260 includes a UI generation unit 261 and a driver control unit 262. The driver control unit 262 transmits and/or receives data to/from the image forming apparatus 300 by driving the driver, and provides a UI by controlling the UI generation unit 261. The driver control unit 262 requests the scan option information stored in the image forming apparatus 300, and receives the at least one scan option information. Although a scan operation is provided as a job related to image forming herein, it is understood that aspects of the present invention are not limited thereto. For example, the job related to image forming may be printing, faxing, etc.

The UI generation unit 261 generates a UI to provide at least one selectable scan profile including the at least one received scan option information, and displays the UI through the display unit 220.

If the image forming apparatus 300 supports the user authentication, the driver control unit 262 controls the UI generation unit 261 to provide the user authentication UI to receive an input of the user authentication information. Here, the user authentication UI may be provided when the driver is driven or the profile is set. The driver control unit 262 transmits the user authentication information inputted through the user authentication UI to the image forming apparatus 300, and receives the at least one corresponding scan option information.

Moreover, the driver control unit 262 provides selectable profiles based on the received scan option information. Accordingly, if one scan profile is selected from the provided profiles, the driver control unit 262 controls the UI generation unit 261 to display the corresponding scan option information. Also, if a scan command for a document to be scanned is inputted through the UI, the driver control unit controls the image forming apparatus 300 to perform the scan in accordance with the displayed scan option information. Here, the scan option information may include a name of the scan profile, a scan driver version, a user ID, a name of the application program, actual scan information data, etc.

The UI generated by the UI generation unit 260 may be implemented as shown in FIGS. 3 to 8, though not limited thereto. That is, the UI may also be implemented in a variety of forms as specified by a developer.

Figure 9:
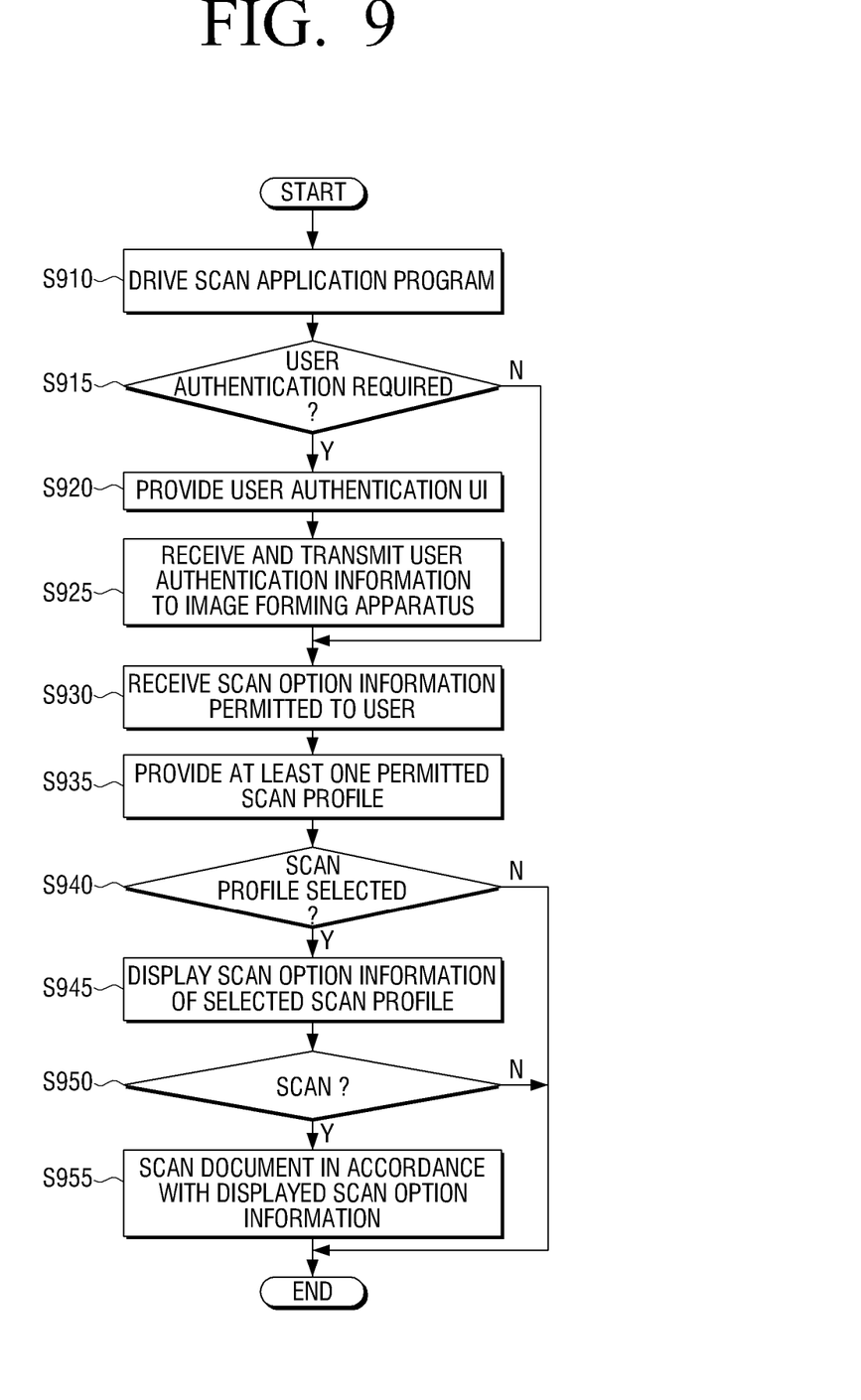
FIG. 9 is a flowchart illustrating a method of setting a job profile of a client device according to an embodiment of the present invention.

FIG. 9 is a flowchart illustrating a method of setting a job profile of a client device according to an embodiment of the present invention. Referring to FIG. 9, if the scan application program is driven in operation S910, a UI to set a scan option to be applied to a corresponding document is provided. Also, if a user authentication is required in operation S915, a user authentication UI is provided in operation S920 to receive an input of a user ID and a password. Then, the input user authentication information is transmitted to the image forming apparatus in operation S925, and the scan option information that is permitted to a user is received from the image forming apparatus in operation S930.

At least one scan profile permitted to the user is provided to the user using the received scan option information in operation S935. If one of the provided scan profiles is selected in operation S940, the scan option information of the selected scan profile is displayed in operation S945. Moreover, if a scan command is inputted in operation S950, the corresponding document is scanned in accordance with the displayed scan option information in operation S955.

Figure 10:
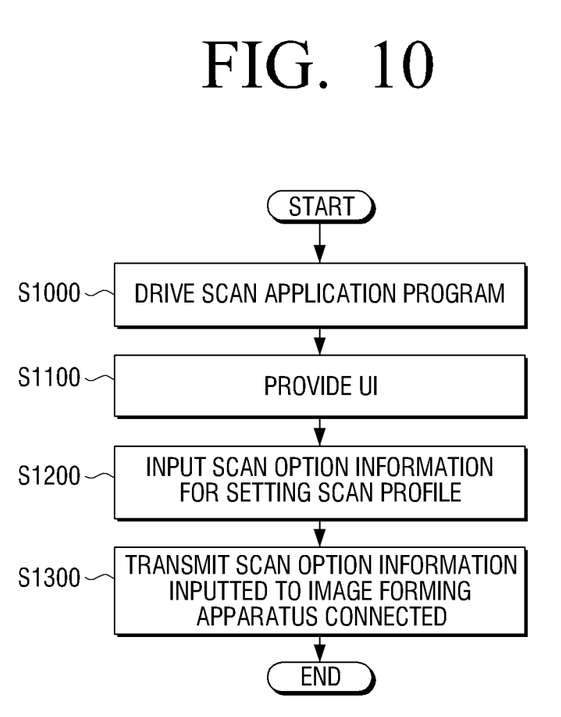
FIG. 10 is a flowchart illustrating a method of setting a scan profile of a client device according to another embodiment of the present invention.

FIG. 10 is a flowchart illustrating a method of setting a scan profile of a client device according to another embodiment of the present invention. Referring to FIG. 10, if the scan application program is driven in operation S1000, a UI related to the scan setting is provided in operation S100. Accordingly, the scan option information for setting the scan profile can be inputted through the UI in operation S1200. Also, the user authentication UI to receive an input of the user authentication information may be provided to receive the user authentication information.

If the scan option information is inputted, the scan option information is transmitted to the image forming apparatus connected thereto in operation S1300. Here, the scan option information may include a name of a scan profile, a scan driver version, a user ID, a name of an application program, actual scan information data, etc.

While not restricted thereto, aspects of the present invention can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A system, the system comprising:
   an image forming apparatus to store at least one job profile corresponding to a function of the image forming apparatus, to control the image forming apparatus; and
   a client device to request a job profile corresponding to a received job command, the client device comprising:
   a driver unit to receive a job command relating to the function of the image forming apparatus;
   an application program unit to request a job profile corresponding to the job command, to receive the job profile from the image forming apparatus, and to execute an application program for generating a user interface (UI) that provides at least one job option of the received job profile; and
   a communication interface connected through a connection interface to a communication interface of the image forming apparatus to perform bidirectional communication, to receive the job profile from the communication interface of the image forming apparatus, and to transmit job option information provided from the driver unit to the communication interface of the image forming apparatus,
   wherein, the driver unit controls the image forming apparatus to perform a job by applying at least one of the job options of the received job profile, and the job command is transmitted from the communication interface to the communication interface of the image forming apparatus to perform the job, the UI includes an image forming apparatus selection unit to select an image forming apparatus from among selectable image forming apparatuses and a profile generation unit to generate a new job profile to be stored in the selected image forming apparatus, and in response to a selection of the profile generation unit, the application program unit provides a user authentication UI to receive an input of user authentication information before job option information is input for the new job profile.

2. The system as claimed in claim 1, wherein the job option is option information of a scan job, the job profile is a scan profile, and the driver unit receives the job option information by executing a scan driver.

3. The system as claimed in claim 1, wherein, if the image forming apparatus uses user authentication information, the driver unit requests the user authentication information from the application program unit, and the application program unit provides the user authentication UI to receive an input of the user authentication information from a user.

4. The system as claimed in claim 3, wherein the driver unit transmits the user authentication information inputted through the user authentication UI to the image forming apparatus, receives a job profile corresponding to the user authentication information, and provides the received job profile to the application program unit.

5. The system as claimed in claim 1, wherein the generated UI provides a plurality of job profiles respectively corresponding to a job command, such that if a job profile is selected, the application program unit displays the corresponding job option of a selected job profile through the UI.

6. The system as claimed in claim 1, wherein the application program unit requests a job profile by transmitting at least one of a name of the job profile, a version of a job driver, a user ID, a name of the application program, and/or actual job information data.

7. The system as claimed in claim 1, wherein the UI further includes a profile selection unit to select a job profile from among selectable job profiles stored in the selected image forming apparatus, the selectable job profiles being received from the selected image forming apparatus in response to the selection of the image forming apparatus, and a profile editing unit to modify a selected job profile from among selectable job profiles stored in the selected image forming apparatus.

8. A system, the system comprising:
an image forming apparatus to store at least one job profile corresponding to a function of the image forming apparatus, to control the image forming apparatus; and
a client device to request a job profile corresponding to a received job command, the client device comprising:
a driver control unit to request job option information stored in the image forming apparatus for forming an image by using scan data read by a scanner and to receive at least one job option information;
a user interface (UI) generation unit to generate a UI to select at least one job option corresponding to the job option information, and to generate a job profile corresponding to at least one of the job options selected through the UI;
a driver unit to receive job option information of the generated job profile;
a communication interface connected through a connection interface to a communication interface of the image forming apparatus to perform bidirectional communication, to receive the at least one job option information from the communication interface of the image forming apparatus, to transmit the generated job profile provided from the driver unit to the communication interface of the image forming apparatus to store the job profile in the image forming apparatus, and to transmit a job command to the communication interface of the image forming apparatus to perform an image forming function corresponding to the command, wherein, the UI includes an image forming apparatus selection unit to select an image forming apparatus from among selectable image forming apparatuses and a profile generation unit to generate a new job profile to be stored in the selected image forming apparatus, and in response to a selection of the profile generation unit, the application program unit provides a user authentication UI to receive an input of user authentication information before job option information is input for the new job profile.

9. The system as claimed in claim 8, wherein, if the image forming apparatus uses user authentication information, the driver control unit controls the UI generation unit to provide the user authentication UI to receive an input of the user authentication information from a user, transmits the user authentication information inputted through the user authentication UI to the image forming apparatus, and receives at least one job option information corresponding to the user authentication information.

10. The system as claimed in claim 9, wherein, if a scan command for a document to be scanned is inputted through the UI, the driver control unit controls the image forming apparatus to perform a scan in accordance with the displayed job option information.

11. The system as claimed in claim 8, wherein the UI further includes a profile selection unit to select a job profile from among selectable job profiles stored in the selected image forming apparatus, the selectable job profiles being received from the selected image forming apparatus in response to the selection of the image forming apparatus, and a profile editing unit to modify a selected job profile from among selectable job profiles stored in the selected image forming apparatus.

12. A system including an image forming apparatus, being connected to a client device,
wherein the client device comprises:
a driver control unit to request job option information stored in the image forming apparatus for forming an image by using scan data read by a scanner and to receive at least one job option information;
a user interface (UI) generation unit to generate a UI to select at least one job option corresponding to the job option information, and to generate a job profile corresponding to at least one of the job options selected through the UI;
a driver unit to receive job option information of the generated job profile;
wherein, the UI includes an image forming apparatus selection unit to select an image forming apparatus from among selectable image forming apparatuses and a profile generation unit to generate a new job profile to be stored in the selected image forming apparatus, and in response to a selection of the profile generation unit, the application program unit provides a user authentication UI to receive an input of user authentication information before job option information is input for the new job profile, wherein the image forming apparatus comprises:
a communication interface connected through a connection interface to a communication interface of the client device to perform bidirectional communication, to receive job option information from the client device, and to receive a job command from the client device corresponding to an image forming function to be performed by the image forming apparatus; and
a control unit to analyze the received job option information, to generate a profile list according to the analyzed job option information, and to store the generated profile list,
wherein, if the client device requests a profile, the communication interface transmits at least one profile selectable by the client device based on the stored profile list to the client device,
wherein the control unit stores the generated profile list directly in a storage of the image forming apparatus without transmitting the generated profile list over a network.

13. The image forming apparatus as claimed in claim 12, wherein the control unit performs a user authentication of a user of the client device, and transmits the profile corresponding to the user authentication information to the client device.

14. A method of setting a job profile of a system comprising a client device and an image forming apparatus having at least one job profile corresponding to a function of the image forming apparatus, the method comprising:
executing an application program corresponding to a job that is to be performed by an image forming apparatus for forming an image by using scan data read by a scanner at the client device;
transmitting a request to a communication interface of the image forming apparatus for a job profile corresponding to the job at the client device;
receiving the job profile from the communication interface of the image forming apparatus at the client device;
generating a user interface (UI) to provide at least one job option of the received job profile at the client device;
selecting, using an image forming apparatus selection unit displayed on the generated UI, an image forming apparatus from among selectable image forming apparatuses;
requesting, using a profile generation unit displayed on the generated UI, to generate a new job profile to be stored in the selected image forming apparatus;
providing, in response to the request to generate the new job profile, a user authentication UI to receive an input of user authentication information;
receiving, after the inputting of the user authentication information, an input of job option information for the new job profile; and
controlling the image forming apparatus to perform the job by transmitting a command to the communication interface of the image forming apparatus and by applying at least one of the job options of the job profile or by applying at least one of the job options of the new job profile, at the client device.

15. The method as claimed in claim 14, further comprising:
if the job option of the job profile is changed, storing the changed job profile in the image forming apparatus at the image forming apparatus.

16. The method as claimed in claim 14, further comprising:
performing user authentication if the image forming apparatus uses the user authentication information at the client device.

17. The method as claimed in claim 16, wherein the receiving of the job profile comprises:
receiving a job profile corresponding to the performed user authentication.

18. The method as claimed in claim 17, wherein the generating of the UI comprises:
generating the UI to provide a plurality of job profiles; and
if a job profile of the plurality of job profiles is selected, displaying at least one job option of the selected job profile through the UI.

19. A non-transitory computer-readable recording medium comprising programs to implement a method of setting a job profile of a client device connected to an image forming apparatus having at least one job profile corresponding to a function of the image forming apparatus, the method comprising:
executing an application program corresponding to a job that is to be performed by an image forming apparatus for forming an image by using scan data read by a scanner at the client device;
transmitting a request to a communication interface of the image forming apparatus for a job profile corresponding to the job;
receiving the job profile from the communication interface of the image forming;
generating a user interface (UI) to provide at least one job option of the received job profile; selecting, using an image forming apparatus selection unit displayed on the generated UI, an image forming apparatus from among selectable image forming apparatuses;
requesting, using a profile generation unit displayed on the generated UI, to generate a new job profile to be stored in the selected image forming apparatus;
providing, in response to the request to generate the new job profile, a user authentication UI to receive an input of user authentication information;
receiving, after the inputting of the user authentication information, an input of job option information for the new job profile; and
controlling the image forming apparatus to perform the job by transmitting a command to the communication interface of the image forming apparatus and by applying at least one of the job options of the job profile or by applying at least one of the job options of the new job profile.

20. The non-transitory computer-readable recording medium as claimed in claim 19, further comprising:
performing user authentication if the image forming apparatus uses the user authentication information at the client device.

21. The non-transitory computer-readable recording medium as claimed in claim 20, wherein the receiving of the job profile comprises:
receiving a job profile corresponding to the performed user authentication.

22. The non-transitory computer-readable recording medium as claimed in claim 21, wherein the generating of the UI comprises:
generating the UI to provide a plurality of job profiles; and
if a job profile of the plurality of job profiles is selected, displaying at least one job option of the selected job profile through the UI.

* * * * *